(12) United States Patent
Gohl et al.

(10) Patent No.: US 10,752,258 B2
(45) Date of Patent: Aug. 25, 2020

(54) APPARATUS AND METHOD FOR AUDIBLE DRIVER CONFIRMATION FOR MANEUVERS IN AN AUTONOMOUS VEHICLE

(71) Applicant: GM GLOBAL TECHNOLOGY OPERATIONS LLC, Detroit, MI (US)

(72) Inventors: Jonathan R. Gohl, Northville, MI (US); Kevin A. O'Dea, Ann Arbor, MI (US); Michael Silvestri, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 16/132,713

(22) Filed: Sep. 17, 2018

(65) Prior Publication Data

US 2020/0086887 A1    Mar. 19, 2020

(51) Int. Cl.
*B60W 50/14* (2020.01)
*B60W 30/18* (2012.01)
*G05D 1/00* (2006.01)
*G10L 15/22* (2006.01)
*G06F 3/16* (2006.01)

(52) U.S. Cl.
CPC ...... *B60W 50/14* (2013.01); *B60W 30/18163* (2013.01); *G05D 1/0088* (2013.01); *G06F 3/167* (2013.01); *G10L 15/22* (2013.01); *G05D 2201/0213* (2013.01); *G10L 2015/223* (2013.01)

(58) Field of Classification Search
CPC ............ B60W 50/14; B60W 30/18163; G05D 1/0088; G05D 2201/0213; G06F 3/167; G10L 15/22; G10L 2015/223
USPC .......................................................... 701/23
See application file for complete search history.

(56) References Cited

U.S. PATENT DOCUMENTS

| | | | |
|---|---|---|---|
| 9,545,930 B2* | 1/2017 | Ricci ................. | G06Q 30/0645 |
| 2014/0306814 A1* | 10/2014 | Ricci ........................ | B60Q 9/00 340/425.5 |
| 2015/0092056 A1* | 4/2015 | Rau .......................... | B60R 1/02 348/148 |
| 2015/0210274 A1* | 7/2015 | Clarke ....................... | B60T 7/12 382/104 |
| 2017/0123423 A1* | 5/2017 | Sako ..................... | G08G 1/123 |
| 2017/0268897 A1* | 9/2017 | Yuan .................... | B60W 40/08 |
| 2017/0364070 A1* | 12/2017 | Oba ...................... | G05D 1/0061 |
| 2017/0369062 A1* | 12/2017 | Saigusa ................ | B60W 30/16 |
| 2018/0111628 A1* | 4/2018 | Tamagaki ............ | G05D 1/0061 |
| 2018/0130347 A1* | 5/2018 | Ricci .................... | G08G 1/0112 |
| 2018/0157257 A1* | 6/2018 | Hashimoto .......... | G05D 1/0088 |
| 2018/0215387 A1* | 8/2018 | Takae ................ | B60W 30/0956 |
| 2018/0215388 A1* | 8/2018 | Takae ................ | G05D 1/0088 |
| 2018/0215389 A1* | 8/2018 | Takae .................... | G08G 1/167 |
| 2018/0222422 A1* | 8/2018 | Takae ..................... | B60R 21/00 |
| 2018/0222423 A1* | 8/2018 | Takae ..................... | B60R 21/00 |
| 2018/0259956 A1* | 9/2018 | Kawamoto ....... | B60W 50/0098 |
| 2018/0284774 A1* | 10/2018 | Kawamoto ........... | G01C 21/26 |
| 2018/0292822 A1* | 10/2018 | Ichikawa ........... | B60W 60/0011 |

(Continued)

*Primary Examiner* — Atul Trivedi
(74) *Attorney, Agent, or Firm* — Lorenz & Kopf, LLP

(57) ABSTRACT

The present application generally relates to a method and apparatus for autonomous vehicle driver confirmation in a motor vehicle. In particular, the system is operative to determine a situation wherein driver confirmation is desired, acoustically request driver confirmation via vehicle speakers, and receive verbal driver confirmation via vehicle microphones.

19 Claims, 4 Drawing Sheets

(56) References Cited

U.S. PATENT DOCUMENTS

| | | | |
|---|---|---|---|
| 2019/0049957 A1* | 2/2019 | Healey | G05D 1/0246 |
| 2019/0071091 A1* | 3/2019 | Zhu | B60W 10/18 |
| 2019/0329782 A1* | 10/2019 | Shalev-Shwartz | G06K 9/00791 |
| 2019/0332106 A1* | 10/2019 | Belloni Mourao | B60K 28/06 |

* cited by examiner

US 10,752,258 B2

APPARATUS AND METHOD FOR AUDIBLE DRIVER CONFIRMATION FOR MANEUVERS IN AN AUTONOMOUS VEHICLE

BACKGROUND

The present disclosure relates generally to operation of autonomous vehicle and driver confirmation of optional maneuvers. More specifically, aspects of the present disclosure relate to systems, methods and devices for determining an optional maneuver during operation of an autonomous vehicle and using the vehicle interior sound system and microphones to request and receive confirmation from a vehicle operator.

Autonomous vehicles operate with various levels of autonomy, generally characterized by five levels, such as level one having the least autonomy, such as adaptive cruise control, to level five having complete autonomy. During operation in levels one to four, a vehicle may be required to make optional decisions, such as geographical route, speed, lane changes or the like. These decisions may not affect operation of the vehicle, but may be dependent only on occupant preference. It would be desirable to enable an autonomous vehicle control system to make these decisions with occupant input in a convenient manner.

The above information disclosed in this background section is only for enhancement of understanding of the background of the invention and therefore it may contain information that does not form the prior art that is already known in this country to a person of ordinary skill in the art.

SUMMARY

Disclosed herein are vehicle braking methods and systems and related control logic for provisioning vehicle steering and braking control systems, methods for making and methods for operating such systems, and motor vehicles equipped with onboard control systems. By way of example, and not limitation, there is presented various embodiments of a generating and receiving an audible occupant input for an automated vehicle control system are disclosed herein.

In accordance with an aspect of the present invention a method of controlling a vehicle comprising 1.

In accordance with another aspect of the present invention a method of controlling a vehicle comprising The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
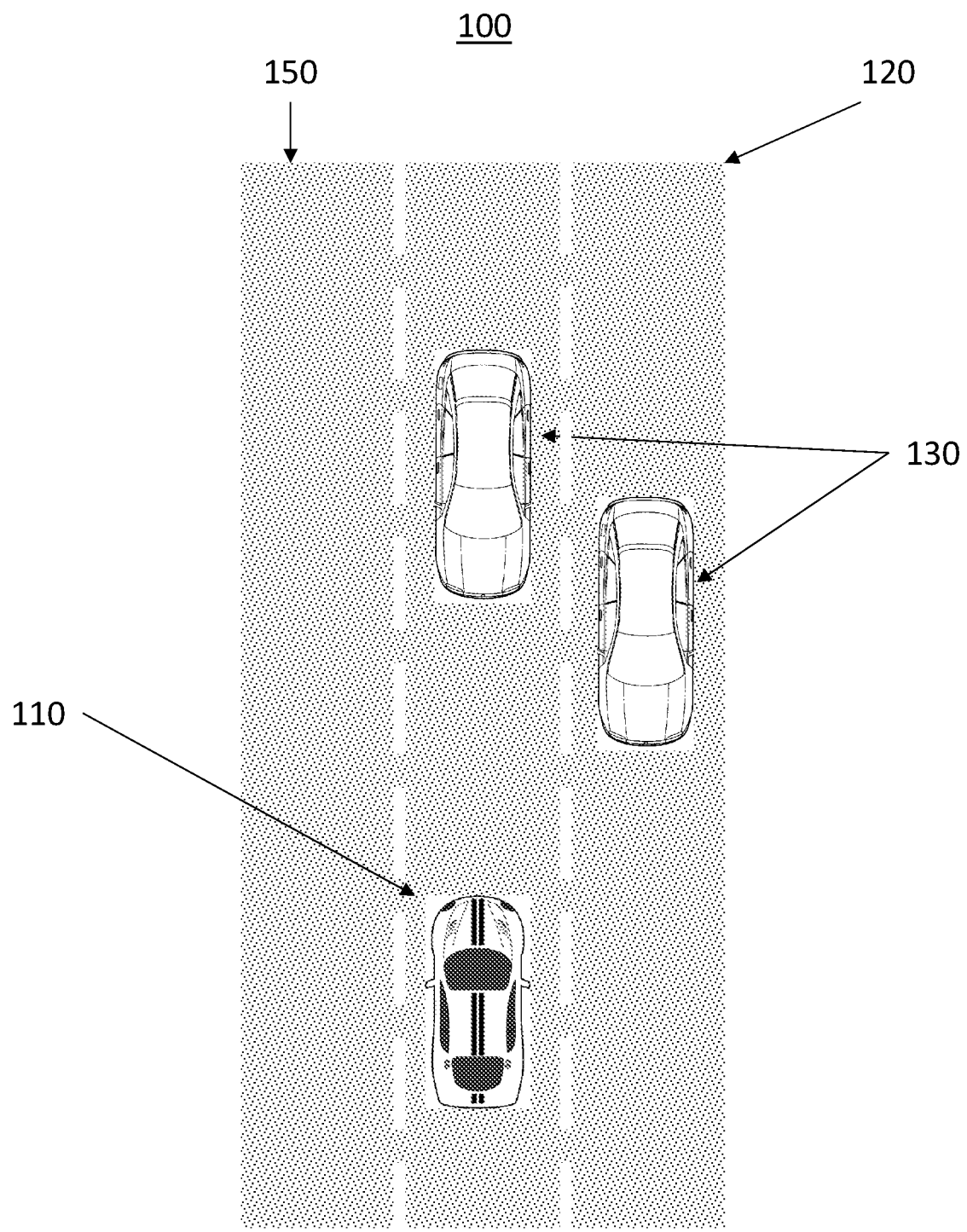
FIG. 1 schematically illustrates an exemplary application of the method and apparatus for audible driver confirmation for maneuvers in an autonomous vehicle according to an exemplary embodiment.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

For autonomous driving control systems, driver attention is required in Society of Automobile Engineers (SAE) level 2 and 3 automation for all operations including lane changes. By using the presently available speakers and microphone to read a description and await acknowledgement the safety case for driver attention to confirm driver engagement with autonomous controls. For example, before a lane change operation, a driver may be asked to check a blind spot and confirm that the target lane is empty.

FIG. 1 schematically illustrates an exemplary application of the method and apparatus for audible driver confirmation for maneuvers in an autonomous vehicle 100 according to the present disclosure. In this exemplary embodiment, an autonomous vehicle control system controlling a first vehicle 110 is employed to navigate a route including a three-lane unidirectional roadway 120. At the situation depicted in the FIG. 1, if the first vehicle 110 is travelling at a speed greater than the leading vehicles 130, the vehicle control system is presented with the option of reducing the speed of the first vehicle in order to match with the speed of the leading vehicles 130, or may change lanes to the leftmost lane 150 and continue traveling at the original speed. At this point, according to an exemplary embodiment of the present disclosure, the vehicle control system may poll a vehicle occupant in order to determine the occupant preference.

In the exemplary embodiment of an application the present disclosure, the vehicle control system may be operative to generate control signal to initiate an audio notification in order to poll an occupant in order to determine the occupant preference concerning a lane change. The audio notification, such as a speech string, may be played on the vehicle speakers requesting whether a lane change is desired. The vehicle control system may then initiate a control signal to activate a vehicle microphone in order to receive a verbal response from the occupant. The verbal response from the occupant is detected by the microphone, coupled to an audio processor and a interpreted. The vehicle control system may engage the lane change or reduce the vehicle speed in response to the verbal response. For example, the system may play "do you desire a lane change towards the left" over the vehicle audio system. The occupant may respond "yes" and the vehicle control system initiates the lane change.

In an alternate embodiment, the vehicle control system may be operative to poll an occupant on a route choice. For example, during navigation, the vehicle control system may determine that an incident has occurred on the planned route and verbally poll the occupant to change route. The occupant may confirm or deny this request. The vehicle control system may alter the planned route in response to a positive response from the occupant.

Figure 2:
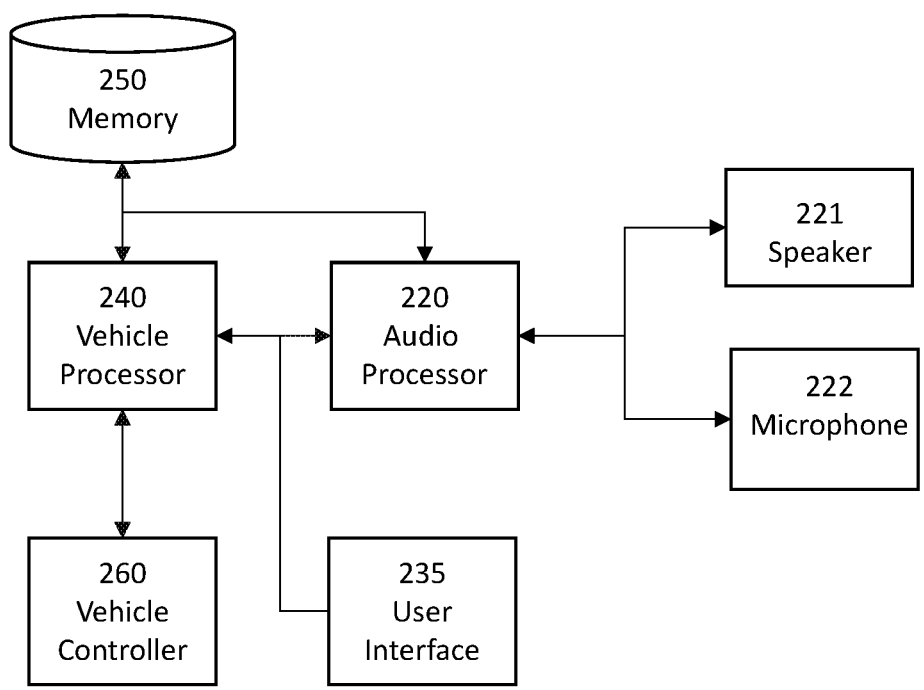
FIG. 2 shows a block diagram illustrating an exemplary system for audible driver confirmation for maneuvers in an autonomous vehicle according to an exemplary embodiment.

Turning now to FIG. 2, a block diagram illustrating an exemplary system for audible driver confirmation for maneuvers in an autonomous vehicle 200 is shown. The exemplary system may have a speaker 221, a microphone 222, an audio processor 220, a vehicle processor 240, a vehicle controller 260, a memory 250 and a user interface 235. In an exemplary application, an instance where an operational choice must be made and wherein the various outcomes of the choices have the same effect on vehicle performance and operation, such as choosing a new navigational route over a previously determined navigational route.

The vehicle processor 240 is first operative to generate a request signal indicating the new option and couple this request signal to an audio processor 220. The audio processor 220 is then operative to generate an audio signal in response to the request signal and play the audio signal to an occupant via a speaker 221 or a speaker system. In this exemplary embodiment, the audio signal may be "Alternate route available. Do you wish to change?" Optionally, the vehicle processor may generate a display control signal in order to display the alternate route on a user interface 235. After the audio signal is played by the speaker 221, the audio processor is operative to activate the microphone 222 in order to receive an occupant verbal response. An audio response signal is receive via the microphone 222 in response to the occupant response. The audio response is coupled to the audio processor 220 and interpreted. The audio response may be interpreted by comparing the audio response to a stored audio response on a memory. A response control signal is generated by the audio processor 220 in response to the audio response and coupled to the vehicle processor 240. Optionally, the response control signal may be optionally compared to at least one stored response on the memory 250. The vehicle processor 240 is operative to generate a vehicle control signal in response to the response control signal and couple the vehicle control signal to the vehicle controller 260. The vehicle processor 240 or the audio processor 220 system may be operative to store the occupant verbal response, or the audio confirmation in the memory. Alternatively the audio confirmation may be transmitted via a wireless network to a cloud storage or the like.

The vehicle controller 260 is operative to control the vehicle in response to the vehicle control signal. For example, if the response control signal indicated a lane change was desired, the vehicle controller 260 may make the lane change in response to the vehicle control signal from the vehicle processor 240.

Figure 3:
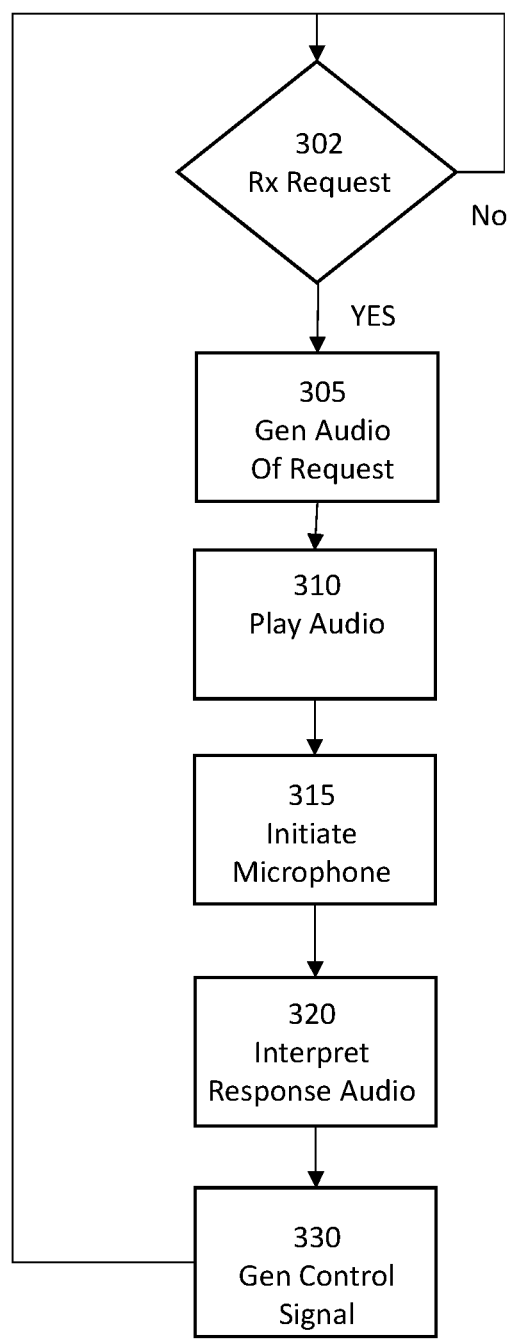
FIG. 3 shows a flowchart illustrating an exemplary method for trailer audible driver confirmation for maneuvers in an autonomous vehicle according to an exemplary embodiment.

Turning now to FIG. 3, a flowchart illustrating an exemplary method for audible driver confirmation for maneuvers in an autonomous vehicle 300 is shown. The method is first operative wait for a request signal for an occupant input 302. If the request is received, the method is then operative to generate an audio signal indicative of the request 305 and couple this audio signal to a speaker system for play to the occupant 310. The method is then operative to initiate a microphone 315 and to receive an occupant response via a response audio signal. The method is then operative to interpret the response audio signal 320 and to generate a response control signal indicative of the occupant response 330. The method is then operative to return to monitoring for a request signal for an occupant input 302. Optionally, the request signal may be generated in response to a navigational option, wherein the navigation option is a lane change option in response to a slower vehicle ahead of the vehicle, and wherein the method is operative to execute a lane change in response to a positive user response and wherein the method is operative to reduce a vehicle speed in response to a negative user response.

Figure 4:
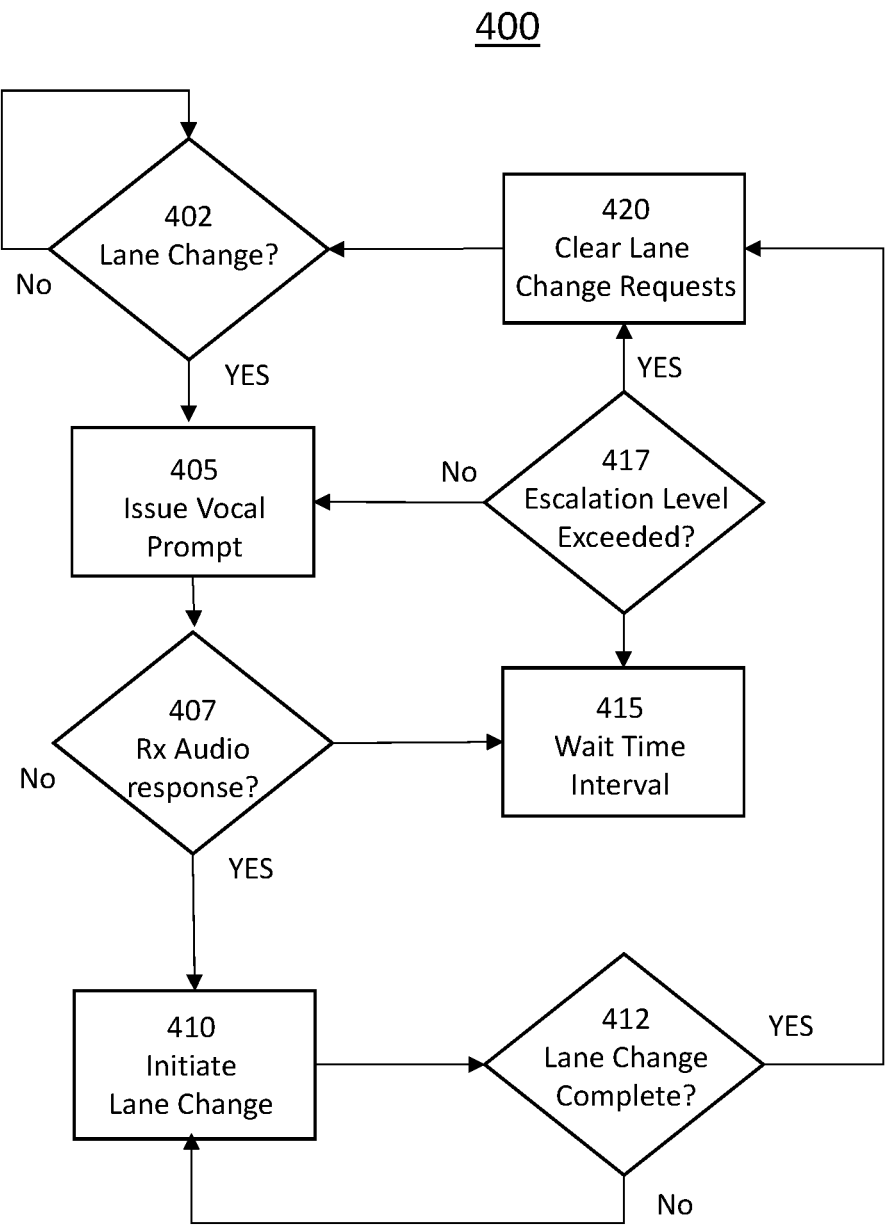
FIG. 4 shows a flowchart illustrating an exemplary method for audible driver confirmation for maneuvers in an autonomous vehicle according to another exemplary embodiment.

Turning now to FIG. 4, a flowchart illustrating an exemplary method for audible driver confirmation of lane change maneuvers in an autonomous vehicle 400 is shown. The method is first operative to wait for a lane change request 402. If the lane change request is received, the method is then operative to issue a vocal prompt to the occupant, such as to check blind spot and request confirmation 405 using the existing vehicle speakers. The method is then operative to monitor for occupant audio response 407 using a vehicle microphone. If the occupant audio response is indicative of a positive response, the method is then operative to initiate the lane change 410. The method is then operative to determine if the lane change is complete 412. If the lane change is not complete 412, the method is then operative to execute the lane change 410. If the lane change is complete 412, the method is then operative to clear all lane change requests 420 and return to monitoring for a lane change request 402.

If the positive occupant audio response is not received in response to the vocal prompt to the occupant 405, the method is then operative to wait a time interval 415. Once the time interval is exceeded, the method is operative to determine if an escalation level has been exceeded 417. An escalation level may be indicative of the number of audio prompts provided to the occupant. If the escalation level has not been exceeded, the method may then be operative increase an escalation counter and to reissue a vocal prompt to the occupant 405. If the escalation level has been exceeded, the method is then operative to clear all lane change requests 420 and return to monitoring for a lane change request 402.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or scab-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle comprising:
   receiving a lane change request;
   playing an audio prompt requesting confirmation of lane change to a vehicle occupant wherein the audio prompt includes a request for a vehicle occupant to check a lane availability;
   generating a control signal to initiate a microphone to receive an audio confirmation from the vehicle occupant;
   receiving an audio confirmation corresponding to a vehicle occupant response; and
   executing a lane change in response to the audio confirmation.

2. The method of claim 1 wherein the audio confirmation is stored in a memory.

3. The method of claim 1 wherein the lane change is performed in response to a vehicle controller.

4. The method of claim 1 wherein the audio prompt is played via a speaker within a vehicle cabin.

5. The method of claim 1 wherein the audio confirmation is received via a microphone within an audio cabin.

6. The method of claim 1 further comprising reducing a vehicle speed in response to not receiving the audio confirmation.

7. An apparatus comprising:
   an audio output for coupling an audio output signal to a speaker wherein the audio output signal is a request for a vehicle occupant to confirm a lane change and to check a lane availability;
   an audio input for receiving an audio input signal from a microphone
   a processor for determining a vehicle maneuver option, generating the audio output signal in response to the vehicle maneuver option and receiving the audio input signal, the processor being further operative to generate a control signal in response to the audio input signal; and
   a controller for executing a vehicle maneuver corresponding the vehicle maneuver option in response to the control signal.

8. The apparatus of claim 7 wherein the vehicle maneuver option is a lane change option.

9. The apparatus of claim 7 wherein the audio input signal is an affirmative response from a vehicle occupant.

10. The apparatus of claim 7 wherein the speaker and the microphone are located inside a vehicle cabin.

11. The apparatus of claim 7 wherein the speaker and microphone are part of a vehicle entertainment system.

12. The apparatus of claim 7 wherein the vehicle maneuver option is a lane change option, the audio input signal is a negative response from a vehicle occupant and the vehicle maneuver is a reduction of speed of the vehicle.

13. A method of controlling a vehicle comprising:
   receiving a request for a user input in response to a navigational option;
   generating an output audio signal in response to the request wherein the audio output signal is a request for a vehicle occupant to confirm a lane change and to check a lane availability;
   receiving an input audio signal;
   determining a user response to the navigation option in response to the audio signal;
   generating an indicator indicative of the user response; and
   executing the navigational option in response to the indicator.

14. The method of claim 13 wherein the audio output signal is played to the user on a speaker within a vehicle cabin.

15. The method of claim 13 wherein the input audio signal is received via a microphone within a vehicle cabin.

16. The method of claim 13 wherein vehicle is an autonomous vehicle.

17. The method of claim 13 wherein the navigational option is a lane change option.

18. The method of claim 13 wherein the user response is a negative response and wherein the navigational option is not executed in response to the indicator.

19. The method of claim 13 wherein the navigational option is a lane change option in response to a slower vehicle ahead of the vehicle, and wherein the method is operative to execute a lane change in response to a positive user response and wherein the method is operative to reduce a vehicle speed in response to a negative user response.

* * * * *